United States Patent
Ichimura et al.

(10) Patent No.: US 6,674,696 B1
(45) Date of Patent: Jan. 6, 2004

(54) FOCUS CONTROLLING APPARATUS AND METHOD, AND OPTICAL DISC DRIVE

(75) Inventors: Isao Ichimura, Kanagawa (JP); Fumisada Maeda, Tokyo (JP); Kenji Yamamoto, Tokyo (JP); Kiyoshi Ohsato, Chiba (JP); Toshio Watanabe, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/049,478

(22) Filed: Mar. 27, 1998

(30) Foreign Application Priority Data

Apr. 2, 1997 (JP) ............................................ P9-084090

(51) Int. Cl.$^7$ ................................................. G11B 7/00
(52) U.S. Cl. ................................ 369/44.35; 369/44.29; 250/201.5
(58) Field of Search ................ 369/44.23, 44.34–44.36, 369/54, 58, 112; 250/201.5; 359/738

(56) References Cited

U.S. PATENT DOCUMENTS

| | | | |
|---|---|---|---|
| 5,109,367 A | * | 4/1992 | Yoshikawa ............ 369/44.36 X |
| 5,615,199 A | * | 3/1997 | Tatsuno et al. .......... 369/100 X |
| 5,712,842 A | * | 1/1998 | Yamamoto et al. .......... 369/112 |
| 5,754,513 A | * | 5/1998 | Yagi et al. .................. 369/112 |
| 5,764,613 A | * | 6/1998 | Yamamoto et al. .......... 369/112 |
| 5,777,961 A | * | 7/1998 | Matsui ...................... 369/44.23 |
| 5,808,983 A | * | 9/1998 | Tsutsui et al. ......... 369/44.34 X |
| 5,828,636 A | * | 10/1998 | Matsumoto et al. . 369/44.35 X |
| 5,978,331 A | * | 11/1999 | Ceshkovsky .......... 369/44.35 X |
| 5,999,502 A | * | 12/1999 | Nakata et al. ........ 369/44.36 X |
| 6,005,834 A | * | 12/1999 | Maeda et al. ......... 369/44.23 X |

* cited by examiner

Primary Examiner—Aristotelis M. Psitos
(74) Attorney, Agent, or Firm—Rader, Fishman & Grauer PLLC; Ronald P. Kananen

(57) ABSTRACT

A focus controller for focusing a light beam and positioning the focused light beam onto a signal recording layer of a signal recording media is disclosed. The controller comprises a light beam focusing means having a numerical aperture of 0.6 or more; a focus controlling means for positioning the light beam focused by the light beam focusing means onto the signal recording layer of the recording media; and an offset adjusting means for adjusting an offset between the focused light beam positioned by the focus controlling means and the signal recording layer of the recording media. The controller positions the light beam focused by an objective lens onto the signal recording layer of a recording media; moves the objective lens within a predetermined optical-axial range, detects an amplitude of a signal read from the recording media at either end of the optical-axial range, and adjusts an offset between the focused light beam positioned by the objective lens and the signal recording layer, depending on a difference between the amplitudes of the detected reproduced signal.

4 Claims, 9 Drawing Sheets

FOCUS ERROR SIGNAL

SUM SIGNAL FROM DETECTOR  DETECTION LEVEL

IN-FOCUS GATE SIGNAL

US 6,674,696 B1

FOCUS CONTROLLING APPARATUS AND METHOD, AND OPTICAL DISC DRIVE

BACKGROUND OF THE INVENTION

1. Field of the Invention

The present invention relates to a focus controlling apparatus and method for focusing a light beam and positioning the focused light beam onto a signal recording layer of a recording media, and an optical disc drive for recording and/or reproducing signal with respect to an optical disc by positioning a focused light beam onto the signal recording layer of the optical disc.

2. Description of Related Art

In an optical disc drive adapted to recording and/or reproducing signal by positioning a focused light beam onto a signal recording layer of an optical disc, a focus servo is employed to control the focus of an optical system in the optical disc drive by converging a reflected light from the optical disc by an optical system and checking whether the light is accurately focused or not for. Typically, the astigmatism or knife-edge method is used for detection of such focused status.

The astigmatism method is such that an optical element such as a cylindrical lens which will cause an astigmatism is used to generate an astigmatism in a light beam to detect a focus error on the basis of the fact that when the signal recording layer of the optical disc is off the focal surface, the reflected light beam will have the section thereof varied in shape from circular to elliptic. In the knife-edge method, a focus error is detected by disposing a knife edge over the width of an optical path along which the reflected and focused light from the optical disc propagates and detecting when the light spot image leaves a photodetector element as the signal recording layer of the optical is off the focal surface.

In an optical system using an objective lens having a numerical aperture of 0.6 or more, however, the depth of focus of the objective lens is so small that the focus error allowance for the focus servo (allowable defocusing) is extremely small. The depth of focus of the objective lens is expressed as $(\lambda/NA)2$. Therefore, the depth of focus of the optical system 100 in which the laser light wavelength $\lambda$ is 640 nm and numerical aperture (NA) of the objective lens is 0.8, for example, is as remarkably small as about ⅕ of that of an optical system in which $\lambda=780$ nm and NA=0.45) for compact discs (CD). Thus, it is necessary to always keep the working focus error within an allowable range by optimizing a residual focus error (offset) being a steady-state deviation between a focused light beam positioned by the focus servo and the signal recording layer of a signal recording media.

For a higher density of signal recording, some optical discs are adapted to record signal on both the grooves and lands formed thereon, or other discs are adapted to use two or more recording layers for recording and/reproducing signal. For signal recording and/or recording signal with respect to such optical discs, a more accurate focus control is required.

One of the factors on which the focus servo offset depends is an assembling inaccuracy. To compensate such an assembling error or inaccuracy, it has been a countermeasure used in the prior art that the offset is roughly adjusted during assembling of an optical pick-up and the residual focus error is controlled to less than its allowance by the focus servo. Thus, the conventional optical pick-up using an objective lens having a high NA has to employ a heavy-duty biaxial actuator having a sufficient gain and band.

It should be assumed here that the oscillation of an optical disc being spun is $\pm 40$ $\mu$m and its fundamental frequency is 60 Hz because the oscillation is synchronous with the optical disc spinning. Then, to limit the offset to a value sufficiently lower than its allowance, the servo gain should be 40 to 50 dB at the above fundamental frequency.

For a focus control using such a heavy-duty biaxial actuator, however, there arise problems such as a larger structure of the optical pick-up and larger power consumption. Also, in optical discs such as a one using both lands and grooves for signal recording and/reproduction, a one having two or more recording layers for signal recording and/or reproduction, etc., an optimum offset of the focus servo varies from one recording position to another on a same optical disc.

SUMMARY OF THE INVENTION

Accordingly, the present invention has an object to overcome the above-mentioned drawbacks of the prior art by providing a focus controlling apparatus and method adapted to automatically adjust a focus servo offset using a conventional actuator for moving an objective lens of an NA as high as 0.6 or more employed in an optical system. Moreover, the present invention has another object to provide an optical disc drive in which the above-mentioned focus controlling method is applied to play a normal read-only optical disc, record and reproduce signal with respect to an optical disc using either grooves or land thereof for signal recording, and record and reproduce signal with respect to a high recording density optical disc designed to record signal at both lands and grooves thereof.

The above object can be accomplished by providing a focus controlling apparatus and method, according to the present invention, in which an offset between a focused light beam positioned by a light beam focusing means of an NA over 0.6 and the signal recording layer of an recording media can be adjusted depending upon a signal read from the recording media to automatically optimize a focus servo offset by a conventional objective lens actuator.

The above object can also be accomplished by providing an optical disc drive designed, according to the present invention, to record and/or reproduce signal with respect to an optical disc using both grooves and lands thereof for signal recording and an optical disc of a high recording density having a plurality of recording layers.

BRIEF DESCRIPTION OF THE DRAWINGS

These objects and other objects, features, aspects and advantages of the present invention will become more apparent from the following detailed description of the preferred embodiment of the present invention when taken in conjunction with the accompanying drawings, of which.

DETAILED DESCRIPTION OF THE PREFERRED EMBODIMENTS

Figure 1:
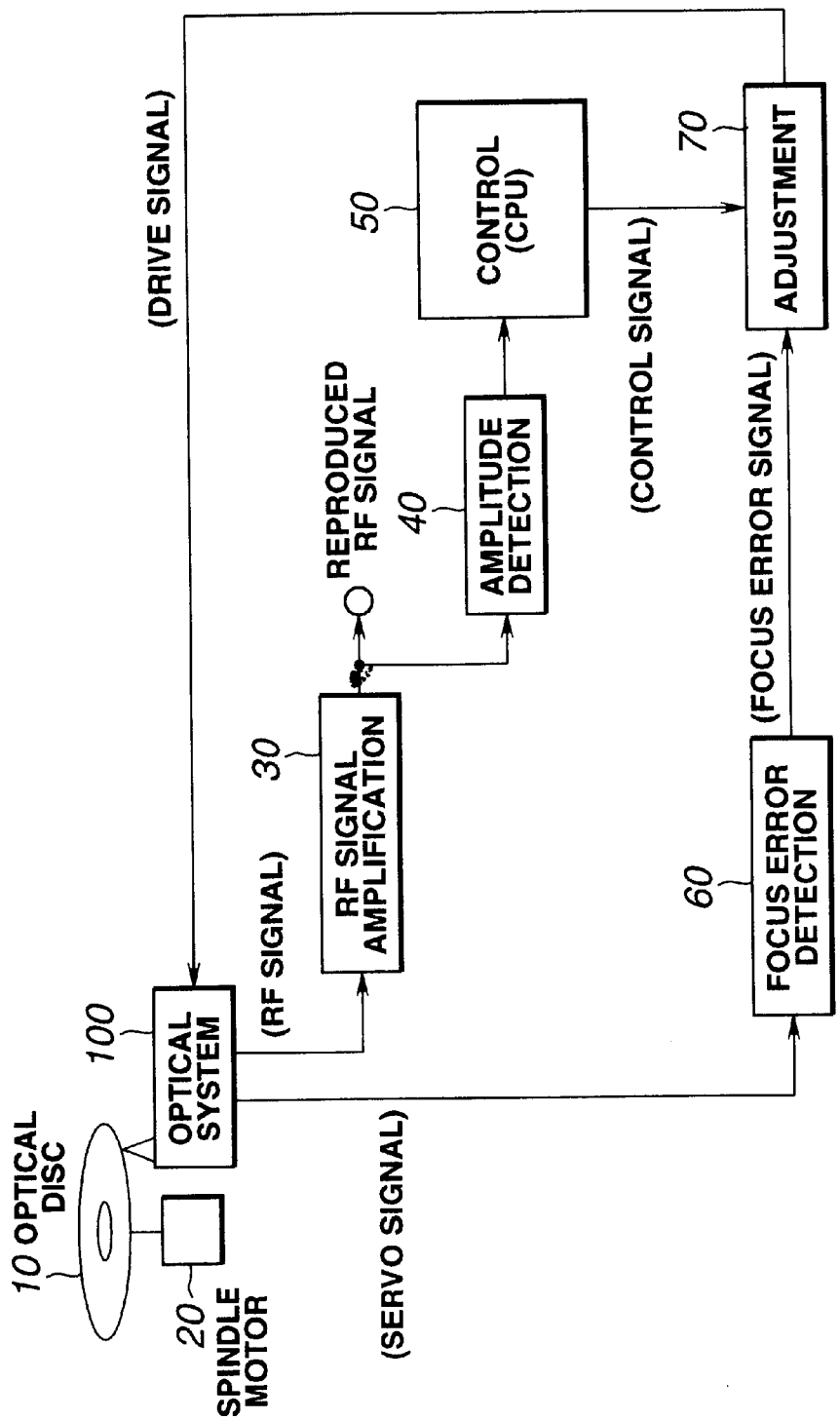
FIG. 1 is a block diagram showing a basic configuration of a light beam focus controlling block of the optical disc drive according to the present invention.

Referring now to FIG. 1, there is illustrated a basic configuration of a block of the optical disc drive according to the present invention that reads signal from an optical disc while controlling the focus of a light beam.

In FIG. 1, an optical disc is indicated with a reference numeral 10. The optical disc is a recording media. Signal is recorded and/or reproduced with respect to the optical disc 10 being spun by a spindle motor 20 by an optical system 100. The optical disc 10 is of a read-only type such as CD-ROM, a one in which signal is recorded only at either the grooves or lands formed thereon, a one in which signal is recorded on both the grooves and lands formed thereon, or the like.

The optical system 100 comprises a reproduction block to read signal from the optical disc 10 and provide a reproduced RF signal, and a recording block to record signal into the optical disc 10 of a recordable type, if applied. Normally, these component systems are incorporated in an optical pick-up.

The optical system 100 provides a focus error signal to position a focused laser light onto the optical disc 10, and also a tracking error signal to control the position of the optical pick-up. The optical system 100 will be described in further detail later.

An RF amplifier circuit 30 is provided to amplify to a predetermined level an RF signal read from the optical disc 10 by the optical system 100. Output from this RF amplifier circuit 30 is supplied as a reproduced RF signal to a signal processor circuit (not shown) provided downstream of the circuit 30 and as a signal to control the focus of the optical system 10 to an amplitude detection circuit 40 as well.

The amplitude detection circuit 40 is provided to detect an amplitude of the reproduced RF signal amplified at the RF amplifier circuit 30. Output of this amplifier circuit 40 is supplied to a control circuit 50.

The control circuit 50 is adapted to control the focus of the optical system 100 based on a servo signal, and adjust a focus servo offset based on the output from the amplitude detection circuit 40. It provides a control signal to an adjustment circuit 70. The control circuit 50 is adapted to form a part of a CPU, for example, which controls the operation of the entire optical disc drive.

The above-mentioned RF signal amplifier circuit 30, amplitude detection circuit 40, and control circuit 50 form together an offset adjusting means for optimizing a residual focus error (offset) caused by a focus controlling means which will be further described later.

A focus error detection circuit 60 is provided to calculate, in a predetermined manner, an output from a photodetector provided in the optical system 100 to detect a reflected light from the optical disc 10, thereby producing a focus error signal which is used to control the focus of the optical system 100.

The adjustment circuit 70 is provided to feed back to the optical system 100 a controlled variable by which the focus of the optical pick-up in the optical system 100 is controlled based on the focus error signal from the focus error detection circuit 60, as an actuator drive signal to move an objective lens. The focus of the optical system 100 is controlled by controlling the lens position of the optical pick-up depending upon the controlled variable.

The above-mentioned focus error detection circuit 60 and adjustment circuit 70 form together a focus controlling means in the optical disc drive.

Figure 2:
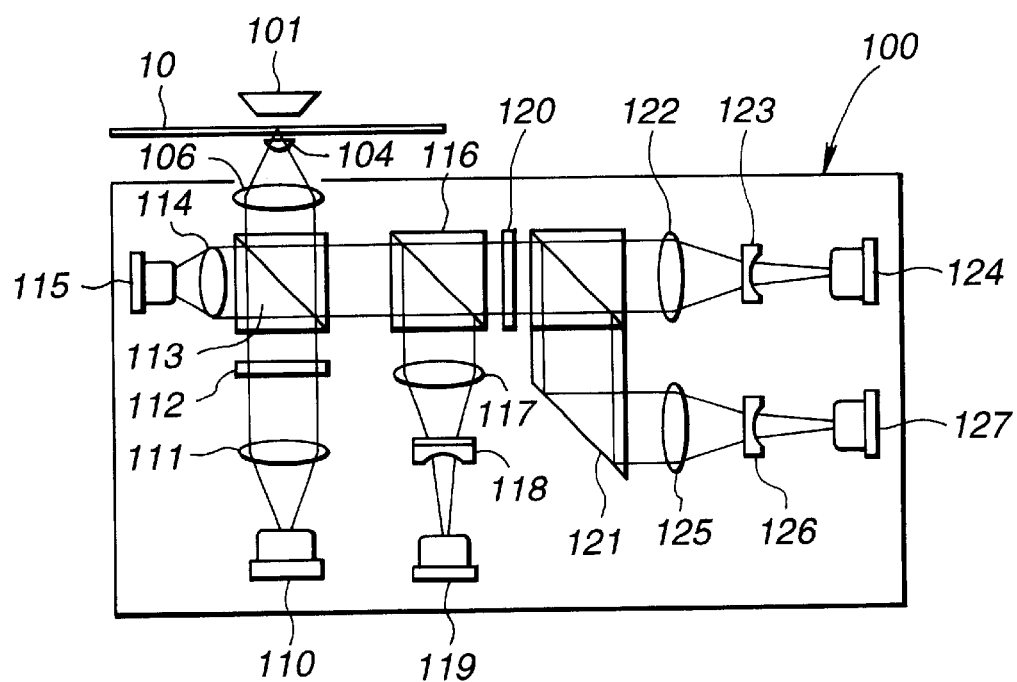
FIG. 2 is a schematic drawing of an example of the configuration of an optical system in the optical disc drive according to the present invention.

FIG. 2 shows in detail an example of the configuration of the aforementioned optical system 100. In this optical system 100, a recording magnetic head 101 is provided supposing that the optical disc 10 is a recordable magneto-optic disc. The other components of the optical system 100 are compatible with optical discs of different types such as a phase-change type, recordable type, read-only type or the like.

An LD (laser diode) 110 is provided as a laser source to emit a laser light for reading signal from the optical disc 10. This laser diode 110 is adapted to generate a light of 640 nm in wavelength. Note that the laser light wavelength should be selected as necessary. A laser light emerged from the LD 110 travels through a collimator lens 111, diffracting grating 112 and a beam splitter 113. It is then focused through an objective lens 106 and an aspherical lens 104 and thus positioned onto the optical disc 10. When the optical disc 10 is a recordable one, the laser light from the LD 110 is used to record signal into the laser disc 10.

On the other hand, a reflected light from the optical disc has a part of p-polarized light component (e.g., 30% or so) thereof and all s-polarized light component thereof guided by the beam splitter 113 along a reproduced signal optical path disposed downstream of another beam splitter 116. A part of the light components from the beam splitter 116 is guided through lenses 117 and 118 onto a servo signal PD (photodiode) 119.

Figure 4:
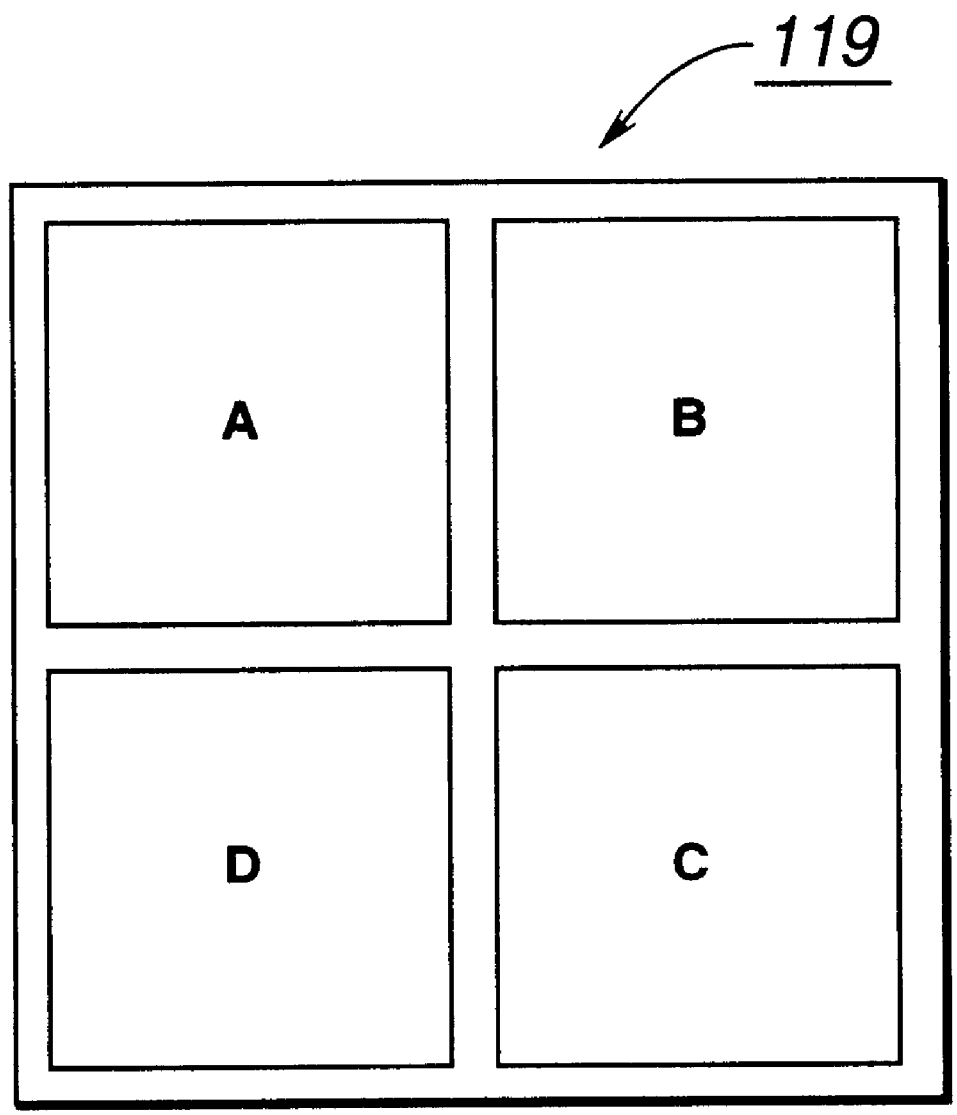
FIG. 4 is a schematic drawing showing the configuration of a photodetector used to detect a reflected light from an optical disc in an astigmatism method in order to detect an focus error.

As shown in FIG. 4, the servo signal photodiode 119 is a quadrature photodetector, namely, it consists of four elements A, B, C and D each of which produces a signal corresponding to the intensity of a light incident upon it. How to produce error signals by the servo signal photodiode 119 and its output signal will be discussed later.

Also, a majority of the light from the beam splitter 116 is guided through a ½ wavelength plate 120 onto a polarized beam splitter 121 which will split the incoming light into two polarized and separate light beams. These light beams are guided through lenses 122 and 123, and lenses 125 and 126 and irradiated onto RF signal photodiodes 124 and 127. The photodiodes 124 and 127 convert the lights into RF signals which will be delivered and subjected to differential amplification to provide a reproduced RF signal.

An automatic power control (APC) photodiode 115 is provided to monitor the intensity of a laser light emitted from the laser diode (LD) 110. A part of the light from the LD 110 and split through the beam splitter 113 is focused by the lens 114 onto the photodiode 115. The intensity of the laser light on the optical disc 10 is controlled for the light incident upon the photodiode 115 to have a predetermined intensity.

The recording magnetic head 101 is provided as mentioned above to record signal into the optical disc 10 which is a recordable magneto-optic disc. For signal recording into the optical disc 10, a part of a recording layer of the optical disc 10 is heated by the laser light from the laser diode 110 to reduce the coercive force of the recording layer, and the signal is magnetically recorded into the optical disc by a magnetic field from the recording magnetic head 101. For this recording, a light beam modulation method is adopted for modulating the light from the laser diode 110. It should be noted, however, that a magnetic field modulation method may be employed for recording by modulating a magnetic field applied from the recording magnetic head.

Figure 3:
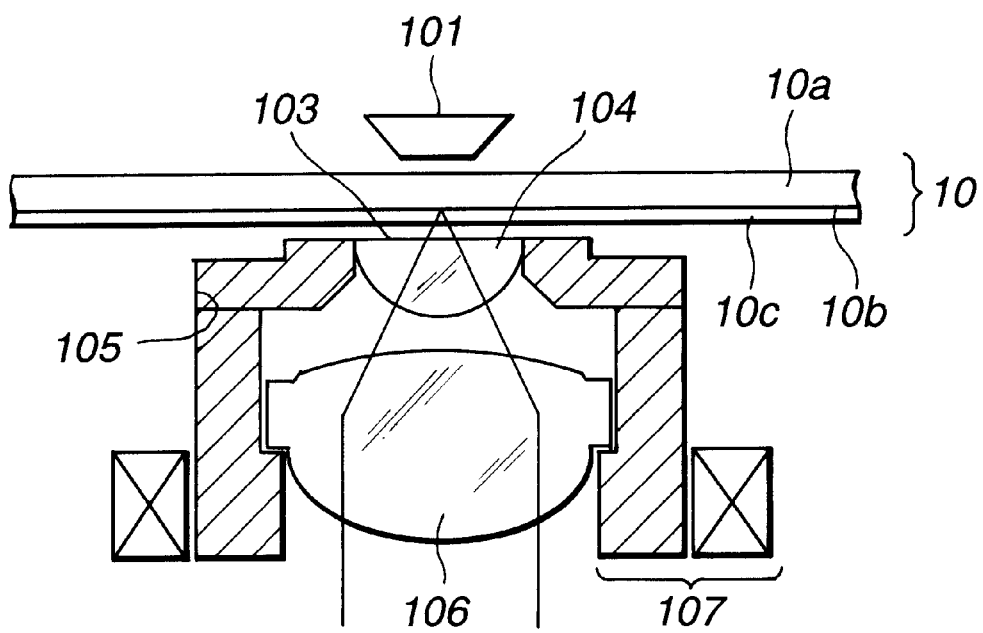
FIG. 3 is a schematic drawing, partially in a sectional form, of the two-group lens comprising an aspherical lens and an objective lens.

FIG. 3 shows in detail the objective lens provided to focus the laser light from the laser diode 110 and position the focused light beam onto the signal recording layer of the optical disc 10. Since a maximum numerical aperture (NA) easily obtainable with a single lens is on the order of 0.6 to 0.7, the optical system 100 of this embodiment uses a two-group lens comprising the aspherical lens 104 and objective lens 106. This two-group lens is constructed as an objective lens unit oriented for the optical system for optical discs and which uses an aspherical two-group lens as a two-group objective lens having an NA of 0.6 or more.

The aspherical lens 104 is a first lens mounted in a lens holder 105 and disposed between the objective lens 106 and the optical disc 10. The lens holder 105 is constructed integrally with a conventional biaxial electromagnetic actuator 107. The objective lens 106 is a second lens also mounted in the biaxial actuator 107. The objective lens 106 used in this embodiment has an NA of about 0.45.

The aspherical lens 104 as the first lens is paired with the objective lens 106 as a second lens to form the two-group objective lens. Because of a power (to bend the light) caused when a focused light beam from the objective lens 106 is incident upon the aspherical lens 104, the two-group objective lens consisting of the aspherical lens 104 and objective lens 106 multiplies the NA of the incoming light by about 1.8 so that the NA of the entire lens unit is about 0.8.

In this optical system 100, the two-group lens formed from the aspherical lens 104 and objective lens 106 is mounted integrally in the biaxial actuator 107, so the focus and tracking control techniques in the conventional optical drive drives may be incorporated as they are in the present invention.

In the case of an optical system formed using an objective lens having a high NA, when the substrate thickness of an optical disc is a conventional one (e.g., 0.6 mm), the allowance against a coma aberration taking place due to a tilt of the optical disc will considerably be reduced. Thus, for signal recording and reproduction with respect to the optical disc using the two-group objective lens having an NA of 0.6 or more, the thickness of the optical disc substrate (including the thickness of a light-transmissive cover layer) should be smaller than the conventional one, 0.6 mm. Especially, when the NA of the objective lens is on the order of 0.8 as in this embodiment, the optical disc substrate has to be further thinner.

More particularly, the optical disc 10 in this embodiment has a light-transmissive cover layer 10c of 0.1 mm in thickness. Also, since the two-group lens having the high NA generally shows a short working distance (WD), this embodiment is designed for an air gap 103 as small as about 100 μm.

FIG. 4 schematically shows an typical configuration of the photodetector quadrants of the servo signal photodiode 119 of the optical system 100. The photodiode 119 is adapted to detect, by the astigmatism method, a focus error from a light reflected from the optical disk 10 and incident upon the photodiode 119.

As mentioned above, the photodiode 119 consists of the four elements or quadrants A, B, C and D. Each of these quadrants A, B, C and D produces a signal corresponding to the intensity of a light incident upon it. These output signals are supplied to the focus error detection circuit 60 where they will be subject to a simple calculation to produce an error signal corresponding to a focus error.

More specifically, assume here that output from the element or quadrant A of the four elements is A, output from the quadrant B is B, output from the quadrant C is C and an output from the quadrant D is D. Then, the error signal FE indicative of a focus error of the light beam positioned onto the optical disc is given by the following expression (1).

$$FE=(A+C)-(B+D) \qquad (1)$$

It should be appreciated that each of these outputs is a voltage produced through a current/voltage conversion of an output current from each element of the photodiode 119.

The error signal FE has a positive value when the optical disc is off the focused position. On the contrary, when the optical disc is close to the focused position, the error signal FE shows a negative value. Namely, the error signal FE will depict a so-called S-curve. In a conventional optical disc drive, the direction of the objective lens optical axis is continuously controlled until the value of the error signal FE is zero, to thereby implement a focus servo. The focus control using the error signal FE will be further described later.

Figure 5A:
FIGS. 5A to 5C show signals used for focus controlling.
Figure 5B:
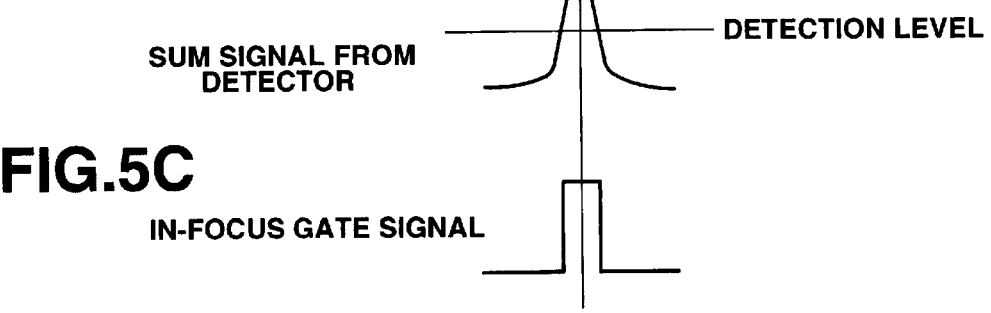
Figure 5C:

FIGS. 5A to 5C show the signal waveforms for the focus control of the optical system 100 using servo signals produced by the above-mentioned servo signal photodiode 119.

FIG. 5A shows a focus error signal FE resulted from a calculation of the expression (1) made with respect to the output from each element of the photodiode 119. As described in the above, the error signal FE depicts an S-shaped continuous waveform (so-called S-curve) in which it takes a positive value when the optical disc 10 is off the focused position while taking a negative value when the optical disc 10 is close to the focused position. Note that the polarity of the error signal FE may be opposite to the above-mentioned one.

FIG. 5B shows a sum SUM of signals from the photodetector. The signal SUM is resulted from an addition of all the outputs A, B, C and D from the photodiode 119.

Also, FIG. 5C shows a focus gate signal produced as a focus signal when an error signal FE exists and the detection sum signal SUM is larger than a predetermined value (detection level). The focus controlling means controls the focus of the optical system by closing and pulling in the servo loop upon detection of the focus gate signal to pull in the focus servo.

Next, the focus controlling method and optical disc drive according to the present invention will be described herebelow.

First, an embodiment of the optical disc drive of the present invention, and then an embodiment of the focus controlling method according to the present invention, will be described with reference to the configuration of the optical disc drive.

Figure 6:
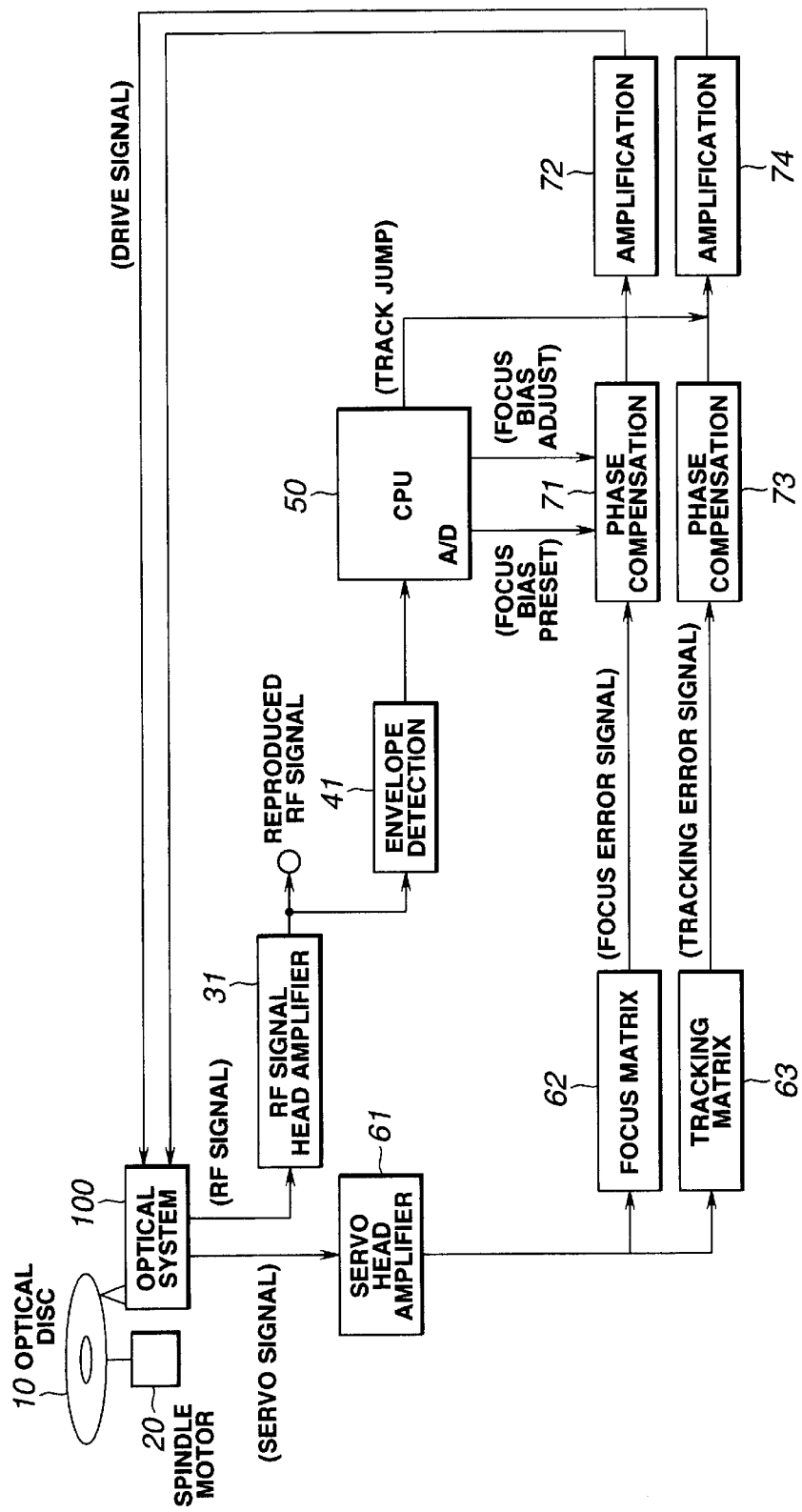
FIG. 6 is a block diagram of an example of the configuration of the optical disc drive according to the present invention.

FIG. 6 is a block diagram of an example of the configuration of the optical disc drive according to the present invention in which the focus control signal shown in FIG. 5 is used to control the optical system focus and adjust the focus servo offset. It should be appreciated that in FIG. 6, the same elements as in FIG. 1 are shown with same references and will not be described herebelow.

First, an RF signal read from the optical disc 10 by the optical system 100 is supplied to an RF signal head amplifier 31 and servo amplifier 61.

The RF signal head amplifier 31 is provided to amplify the RF signal read from the optical system 100 to a predetermined level necessary for subsequent processing of the signal. The reproduced RF signal amplified by the amplifier 31 is supplied to a signal processor (not shown) provided downstream and also to an envelope detection circuit 41 as a signal for focus control of the optical system 100.

The envelope detection circuit 41 is adapted to detect an envelope of the reproduced RF signal amplified by the RF signal head amplifier 31 in order to detect its amplitude. The output of the envelope detection circuit 41 is delivered to the control circuit (CPU) 50.

The CPU 50 controls the operation of the entire optical disc drive, and is also provided with a function to control the focus of the optical system 100. The output from the envelope detection circuit 41 is subject to an A/D conversion in an A/D converter in the CPU 50, and processed in a predetermined control procedure to produce control signals for focus and tracking control of the optical system 100. The control procedure will be further described later.

In this optical disc drive, the aforementioned RF head amplifier 31, envelope detection circuit 41 and CPU 50 form together an offset adjusting means which will be described later, and optimizes a residual focus error (offset) caused by the focus controlling means.

On the other hand, the servo head amplifier 61 is adapted to amplify, to a predetermined level necessary for subsequent processing, an output from the servo signal photodiode 119 provided in the optical system 100 to detect a reflected light from the optical disc 10. The amplified servo signal, an output from the photodiode 119, is sent to a focus error detection circuit 62 and a tracking error detection circuit 63.

The above focus error detection circuit 62 is adapted to process in a predetermined manner an output supplied from the photodiode 119 and amplified by the servo head amplifier 61 to produce an error signal for focus control of the optical system 100. The calculation effected here by the focus error detection circuit 62 uses the aforementioned expression (1).

Further, a phase compensation circuit 71 is provided and adapted for phase compensation, based on a phase delay or the like of the actuator 107, of an error signal from the focus error detection circuit 62, and control signals such as a preset focus bias, adjusted focus bias, etc. supplied from the CPU 50. The output from the phase compensation circuit 71 is amplified as necessary by an amplifier 72 provided for this purpose, and fed back to the optical system 100.

Further, the tracking error detection circuit 63 is adapted to process an output signal delivered from the photodiode 119 and amplified by the servo head amplifier 61 as necessary for tracking control, thereby producing an error signal used for focus control of the optical system 100.

The error signal from the tracking error detection circuit 63 is subjected to a phase compensation in the phase compensation circuit 73, amplified as necessary in the amplifier 74, and then fed back to the optical system 100.

In this optical disc drive, the above-mentioned servo head amplifier 61, focus error detection circuit 62, tracking error detection circuit 63, phase compensation circuits 71 and 73, and amplifiers 72 and 74 form together the focus controlling means.

The offset adjusting means of the optical disc drive is adapted to control the focus servo offset so that the RF signal read from the optical disc 10 has a maximum amplitude. For this purpose, an envelope of the reproduced RF signal is detected in the envelope detection circuit 41 by intentionally changing the position (offset) of the objective lens while the focus servo is in operation, and the position of the biaxial actuator 107 is controlled for the reproduced RF signal to have a maximum amplitude.

It should be noted that in this embodiment, the astigmatism method is used to produce an error signal for focus control of the optical system, while the differential push-pull (DPP) method is used to produce an error signal for tracking control of the optical system.

Next, an embodiment of the focus controlling method according to the present invention will be discussed with reference to the configuration of the optical disc drive shown by way of example in FIG. 6 and the aforementioned configuration of the optical system 100.

Figures 7A, 7B:
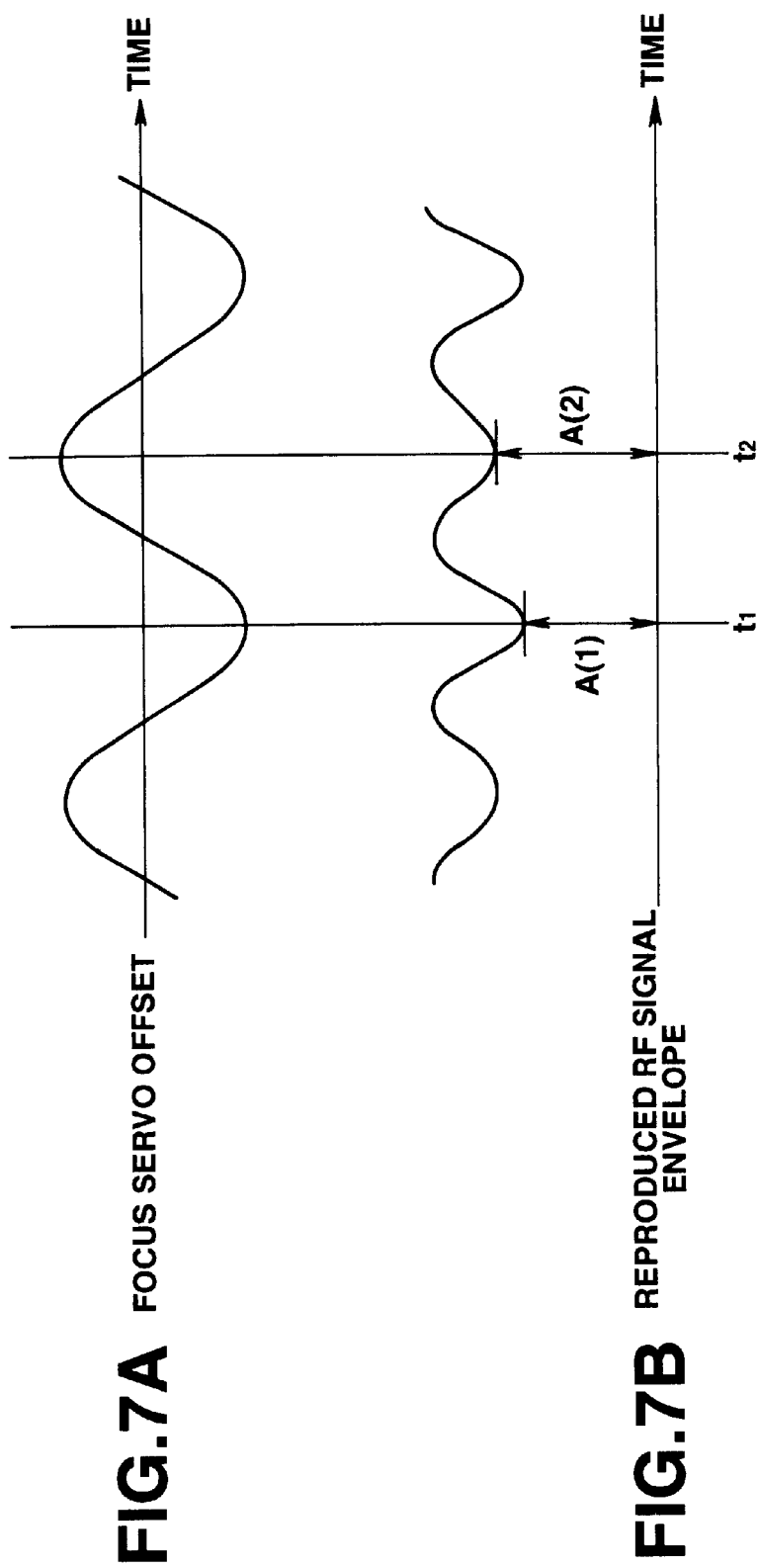
FIGS. 7A and 7B explain together an operation of detecting an optimum focus servo offset while moving the objective lens periodically in the direction of the optical axis.

FIGS. 7A and 7A show a focus servo offset and a reproduced RF signal envelope, respectively. These Figures explain an operation of the optical disc drive shown in FIG. 6 for detection of an optimum offset of the focus servo by periodically moving in the direction of the optical axis the actuator 107 having mounted therein the objective lens of the optical system 100.

FIG. 7A shows an example of the waveform of a drive signal supplied from the amplifier 72 to drive the actuator 107. As seen, when the actuator 107 is driven with a drive current having a sine waveform, the distance between the objective lens and optical disc 10, namely, an offset of the focus servo, changes depicting a sine waveform. It should be noted that the frequency of this drive signal is sufficiently lower than a frequency band in which the focus servo loop keeps an effective gain, for example, on the order of several tens Hz to 1 kHz. An information for optimization of the focus offset is obtainable by moving the objective lens once within an arbitrary optical-axial range. By periodically repeating the movement of the objective lens, however, a control signal of a better S/N ratio can be produced. Also, the actuator 107 is moved with this drive signal over a distance of about ±0.1 $\mu$m.

FIG. 7B shows how the envelope of the reproduced RF signal changes as the objective lens is moved when the actuator 107 is driven with the drive signal as shown in FIG. 7A. When the focus servo offset is an optimum value, the focus changes about the signal recording layer of the optical disc 10 so that the reproduced RF signal will have a maximum amplitude (envelope). On the other hand, the envelope of the reproduced RF signal shows a minimum value at a point t1 where the objective lens is closest to the optical disc 10 and at a point t2 where the objective lens is farthest from the optical disc 10.

If the amplitude A(1) at the point t1 being one extremity of the moving range of the objective lens and the amplitude A(2) at the point t2 being the other extremity of the range are different from each other, it means that the central value of the sine wave is deviated from the optimum focus offset value.

Thus, it is judged whether the focus is off or close to the signal recording layer of the optical disc 10. The polarity of the error signal depends upon the relationship in magnitude between the amplitudes A(1) and A(2). The focus offset of the optical system 100 can be optimized by adjusting the focus servo offset based on this fact for the amplitude A(1) at the point t1 to be equal to the amplitude A(2) at the point t2.

The experiment results prove that the allowable degree of defocusing of the optical system 100 in the optical disc drive shown in FIG. 6 is on the order of ±0.8 $\mu$m. The above-mentioned method permits to optimize the focus offset to the allowable degree of defocusing in a time of about 100 ms.

As previously mentioned, the air gap 103 is also as small as about 100 μm because the working distance WD of the objective lens is short. Taking this fact in account for the focus offset adjustment, the focus servo pull-in operation is made while the objective lens unit is moving toward the optical disc 10 to prevent the aspherical lens 104 from colliding with the optical disc 10. For this reason, it is also necessary to judge, with reference to the polarity of the error signal FE, whether the optical disc 10 is off or close to the focused position.

This embodiment makes the most of the fact that the reproduced RF signal has a maximum amplitude when the focus servo offset is an optimum value. However, it should be noted that the focus may also be controlled based on the fact that the jitters of the reproduced RF signal will be minimum with the optimum focus servo offset.

It should also be appreciated that the focus controlling method and optical disc drive according to the present invention can suitably be used for signal recording and/or reproduction with respect to an optical disc in which signal is recorded on both the lands and grooves thereof for a higher recording density.

Figure 8:
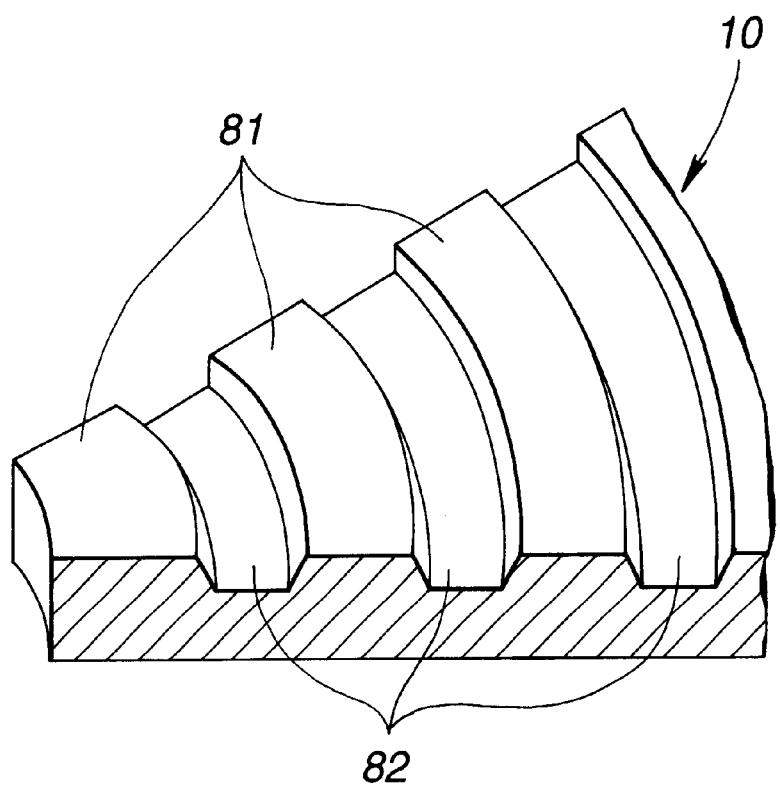
FIG. 8 is an explanatory drawing of the grooves and lands formed on an optical disc.

FIG. 8 a fragmentary view, enlarged in scale, of an optical disc having the lands and grooves formed thereon. The reference numeral 82 indicates guide grooves formed spirally on an optical disc, and the reference numeral 81 indicates lands that are portions of the optical disc where the grooves 82 are not formed. Generally, the land and groove are designed to have a same width in order to prevent a cross-talk between signals recorded in the lands 81 and grooves 82. The groove 82 is formed to a depth of λ/6 or so.

When an optical disc 10 set in the optical disc drive is a one in which signals are recorded at both the lands 81 and grooves 82, an focus offset value preset for the lands is used to pull in the focus servo in the aforementioned procedure. Then the method also referred to in the foregoing is used to make a fine adjustment of the focus servo offset because the optimum offset for the lands 81 is different from that for the grooves 82.

Furthermore, for shifting a recording or reproduction from a track on the land 81 to a one on the groove 82 during a preset focus bias is used to jump to the track on the groove 82, and then the focus servo offset is finely adjusted in a same manner.

It should be noted that for signal recording into a recordable optical disc like a magneto-optic disc, the focus servo offset has also to be adjusted before that recording. If a fresh optical disc with no record of signal thereon is used, a preformatted address signal, sync mark for synchronous focus servo pull-in operation, etc. are also used to optimize the focus offset for the reproduced signal to have a maximum amplitude.

Figure 9:
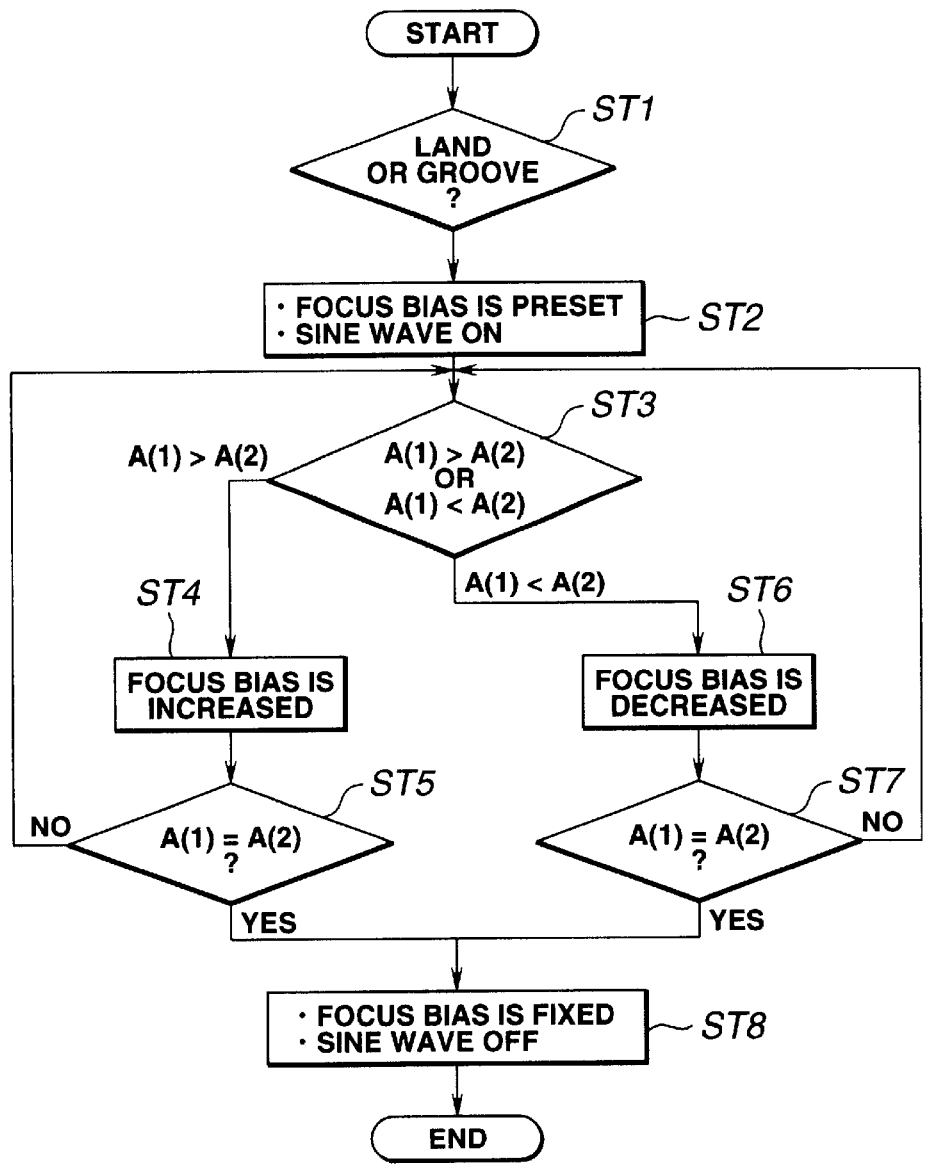
FIG. 9 is a flow chart of the focus controlling procedure according to the present invention.

FIG. 9 is a flow chart showing the operations involved in the aforementioned procedure of optimizing the focus servo offset.

After the above procedure gets started, it is checked at Step ST1 whether the optical disc set in the optical disc drive is a one having signal recorded at either the lands or grooves thereof. The focus servo is pulled in as having been described in the foregoing, and a drive current is supplied to the biaxial actuator 107 while the servo loop is being closed, to move the objective lens in the direction of the optical axis to a position where a signal read from the optical disc has a best quality.

The above operations are intended for checking that the reflected light from the optical disc is a one from a target signal recording layer. Generally, the optical disc surface has a reflectivity of about several percents, so that as the objective lens is moved toward the optical disc, a reflected light from the optical disc surface will be first detected.

Thus, unless the above operations are done, a focus control will be done by pulling in the servo loop with respect to the surface of the optical disc. The above operations are also done for the reason that when the optical disc set in the optical disc drive is a one having two signal recording layers such as a DVD (digital video disc or digital versatile disc), it is necessary to judge which recording layer, the first or second, of the optical disc the focus control is being done for.

At Step ST2, a focus bias which is a target value for adjustment of focus servo offset, is set to a preset value. Also, the actuator 107 is supplied with a sine-wave drive signal to periodically inch the objective lens in the direction of the optical axis.

At Step ST3, a change in the amplitude (envelope) shown by the reproduced RF signal when the sine-wave drive signal is supplied to the actuator 107 to periodically inch the objective lens, is detected to judge whether the amplitude A(1) is larger or smaller than A(2) as having been described with reference to FIG. 7B. When A(1)>A(2), the operation goes to Step ST4. On the contrary, when A(1)<A(2), the operation goes to Step ST6.

At Step ST4, an operation is done to increase the focus bias because the status A(1)>A(2) means in this embodiment that the optical disc is off the focused position.

At Step ST5, it is judged whether A(1)=A(2). If so, the operation goes to Step ST8. If A(1) is not equal to A(2), the operation goes back to Step ST3.

On the other hand, an operation is made to decrease the focus bias at Step ST6 because the status A(1)<A(2) means in this embodiment that the optical disc is close to the focused position.

At Step ST7, it is judged whether A(1)=A(2). If so, the operation goes to Step ST8. If not, the operation goes back to Step ST3.

At Step ST8, a focus bias is fixed for the status A(1)=A(2). The supply of the sine-wave drive signal to the actuator 107 is stopped, so that the normal operation of reproduction will be restored. It should be noted that if the operation at Step ST1 is omitted, a focus offset value may not possibly be optimum for an optical disc having grooves formed thereon even when the status A(1)–A(2) is attained. Diffracted lights from the grooves, namely, irregular surface of the optical disc, will affect a focus control effected by the astigmatism method.

With the above procedure, focus servo offset of the optical system 100 can be adjusted to an optimum value.

In the foregoing, the present invention has been described on the assumption that the optical disc is a magneto-optic disc. However, it should be appreciated that the present invention is also applicable to other types of optical discs including a phase-change based optical disc, recordable optical disc, etc. and that the light beam converging means in the optical system 100 of the present invention may be formed from a single lens or a lens group of three or more lenses.

What is claimed is:

1. A focus controlling apparatus for focusing a light beam and positioning the focused light beam onto a signal recording layer of a signal recording media, comprising:

a light beam focusing means having a numerical aperture of 0.6 or more;

a focusing controlling means for providing a focus control to position the light beam focused by the light beam focusing means onto the signal recording layer of the recording media; and an offset adjusting means for adjusting an offset between the focused light beam focus positioned by the focus controlling means and the signal recording layer of the recording media depending upon an RF signal read from the recording media;

wherein the offset adjusting means periodically moves the light beam focusing means within a predetermined optical-axial range to adjust the offset depending upon an amplitude of a signal read from the recording media at either end of the optical-axial range; and the light beam focusing means moves depicting a sine waveform.

2. A focus controlling method for focusing a light beam and positioning the focused light beam onto a signal recording layer of a signal recording media, comprising the steps of:

positioning the light beam focused by an objective lens onto the signal recording layer of the recording media;

periodically moving the objective lens within a predetermined optical-axial range, detecting an amplitude of an RF signal read from the recording media at either end of the optical-axial range, and adjusting an offset between the signal recording layer of the recording media depending upon a difference between the amplitudes of the detected RF signal;

wherein during said step of periodically moving, a sinusoidal movement is used.

3. A focus controlling method for focusing a light beam and positioning the focused light beam onto a signal recording layer of a signal recording media, comprising the steps of:

positioning the light beam focused by an objective lens onto the signal recording layer of the recording media;

periodically moving the objective lens within a predetermined optical-axial range, detecting an amplitude of an RF signal read from the recording media at either end of the optical-axial range, and adjusting an offset between the signal recording layer of the recording media depending upon a difference between the amplitudes of the detected RF signal; and wherein said positioning and detecting steps are done alternately for at least one period of said signal.

4. An optical disc drive for recording and/or reproducing a signal by positioning a focused light beam onto a signal recording layer of a signal recording media, comprising:

a light beam focusing means having a numerical aperture of 0.6 or more;

a focus controlling means for positioning the light beam focused by said light beam focusing means onto the signal recording layer of the recording media; and an offset adjusting means for adjusting an offset between the focused light beam positioned by the focus controlling means and the signal recording layer of the recording media depending upon an RF signal read from the recording media;

wherein the offset adjusting means periodically moves the light beam focusing means within a predetermined optical-axial range to adjust the offset depending upon an amplitude of a signal read from the recording media at either end of the optical-axial range; and the light beam focusing means moves depicting a sine waveform.

* * * * *

UNITED STATES PATENT AND TRADEMARK OFFICE
CERTIFICATE OF CORRECTION

PATENT NO. : 6,674,696 B1
DATED : January 6, 2004
INVENTOR(S) : Isao Ichimura et al.

It is certified that error appears in the above-identified patent and that said Letters Patent is hereby corrected as shown below:

Title page,
Item [*] Notice, replace "Subject to any disclaimer, the term of this patent is extended or adjusted under 35 U.S.C. 154(b) by 0 days" with -- Subject to any disclaimer, the term of this patent is extended or adjusted under 35 U.S.C. 154(b) by 758 days --.

Signed and Sealed this

Twenty-second Day of March, 2005

JON W. DUDAS
*Director of the United States Patent and Trademark Office*